United States Patent
Jain

(10) Patent No.: US 7,496,144 B2
(45) Date of Patent: Feb. 24, 2009

(54) ALLOCATING DATA BETWEEN TONES IN A VDSL SYSTEM

(75) Inventor: Raj Kumar Jain, Mandarin Gardens (SG)

(73) Assignee: Infineon Technologies AG, Munich (DE)

( * ) Notice: Subject to any disclaimer, the term of this patent is extended or adjusted under 35 U.S.C. 154(b) by 590 days.

(21) Appl. No.: 11/073,000

(22) Filed: Mar. 4, 2005

(65) Prior Publication Data

US 2006/0056526 A1   Mar. 16, 2006

(30) Foreign Application Priority Data

Mar. 5, 2004  (SG) .............................. 200401383-5

(51) Int. Cl.
*H04K 1/10* (2006.01)

(52) U.S. Cl. ...................................... 375/260; 375/222
(58) Field of Classification Search ................. 375/260, 375/222

See application file for complete search history.

(56) References Cited

U.S. PATENT DOCUMENTS

| | | | | | |
|---|---|---|---|---|---|
| 6,134,273 | A | * | 10/2000 | Wu et al. | 375/261 |
| 6,151,335 | A | * | 11/2000 | Ko et al. | 370/487 |
| 6,389,062 | B1 | * | 5/2002 | Wu | 375/222 |
| 6,501,791 | B1 | * | 12/2002 | Hwang | 375/222 |
| 7,010,027 | B1 | * | 3/2006 | Mestdagh et al. | 375/222 |
| 2005/0111535 | A1 | * | 5/2005 | Saey | 375/222 |

OTHER PUBLICATIONS

VDSL1, ITU-T Standard VDSL1 "Very high speed digital subscriber line", pp. 5-7, 26-30, 106-107, 176-180, Feb. 19, 2004.*

* cited by examiner

*Primary Examiner*—Juan A Torres
(74) *Attorney, Agent, or Firm*—Slater & Matsil, L.L.P.

(57) ABSTRACT

A new protocol is proposed for transmission of data through lines such as telephone lines. The tones of a signal are associated into groups 10, 11, and tone ordering, gain selection, and/or bit swapping within the processing system are done within the members of a group 10, 11. This idea is applicable both to tone ordering etc., following the training stage, and also to the dynamic configuration changes subsequently, for example, bit swapping. The computational cost of coding and decoding the data is reduced (compared to treating all the tones of a given direction equivalently), and the invention makes it possible to significantly reduce the memory requirements of the encoder and decoder.

21 Claims, 6 Drawing Sheets

ALLOCATING DATA BETWEEN TONES IN A VDSL SYSTEM

This application claims priority to Singapore Patent Application 200401383-5, which was filed Mar. 5, 2004, and is incorporated herein by reference.

CROSS-REFERENCE TO RELATED APPLICATIONS

This application relates to the following co-pending and commonly assigned patent applications, all filed concurrently herewith: Ser. No. 11/072,922, entitled "Computationally Efficient Protocols for VDSL System", Ser. No. 11/071,987, entitled "VDSL Protocol with Low Power Mode", and Ser. No. 11/073,001, entitled "Trellis Modulation Protocols for a VDSL System", which applications are hereby incorporated herein by reference.

TECHNICAL FIELD

The present invention relates to methods for transmitting data, in particular over telephone lines (typically, copper telephone lines) or similar lines. It further relates to systems arranged to perform the methods.

BACKGROUND

The use of fast Internet connections has grown rapidly over the last few years, and consequently the demand for broadband (high-speed) connections is increasing.

One technology that is very well known in the market is Asymmetric Digital Subscriber Line (ADSL) technology. This employs the frequency spectrum indicated schematically in FIG. 1. "Upstream" communications (that is in the direction from the home or office user premises, "customer premises equipment" or "CPE", to the "central office", or "CO" or DSLAM, FTTC, or Fibre To The Curb, or FTTH, Fibre To The Home cabinets) are transmitted on frequencies in the range of 25 kHz (i.e., above the maximum audible frequency of 4 kHz) to 138 kHz. "Downstream" communications are in a higher frequency band from 138 kHz to an upper limit. According to the first two versions of ADSL (ADSL and ADSL2) the downstream band goes up to 1.1 MHz, whereas in ADSL2+ it goes up to 2.2 MHz. The upstream can be also extended from 0 kHz up to 276 kHz, also known as All Digital Loop and extended upstream. Within each of the upstream and downstream bands, the range is divided into 4 kHz intervals, "tones," so that the downstream band includes 256 tones in ADSL and ADSL2 (which is capable of transmitting 8 MBps), and 512 tones in ADSL2+ (which is capable of transmitting 28 MBps). Each tone is encoded by quadrature amplitude modulation ("QAM"), and can encode between 0 and 15 bits. During a training phase, the line conditions (signal to noise ratio, SNR) of each of the tones is estimated, and the number of bits which will be encoded in each tone during each frame is selected.

In a typical ADSL modem, the main sections are (i) a Digital Interface (which may use asynchronous transfer mode (ATM)); (ii) a Framer (also referred to here as a framing unit); (iii) a Discrete MultiTone (DMT) Modulator; (iv) the AFE (Analog Front End); and (v) a Line Driver.

The framer multiplexes serial data into frames, generates FEC (forward error correction), and interleaves data. FEC and data interleaving corrects for burst errors. This allows DMT-based ADSL technology to be suitable for support of MPEG-2 and other digital video compression techniques. For the transmit signal, an Encoder encodes frames to produce the constellation data for the DMT Modulator. It assigns the maximum number of bits per tone (based on measured SNR of each tone) and generates a QAM constellation where each point represents a digital value. Each constellation point is one of N complex numbers, x+iy, where x and y are the phase and amplitude components. The summation of bits in all carriers, multiplied by the frame rate (4 kHz), represents the data rate. For the receive signal, the decoder converts QAM symbols back into the data bitstream.

In the DMT Modulator, a frequency domain processor implements FFT/IFFT and associated processing. In the transmit path, the Inverse Fast Fourier Transform (IFFT) module accepts input as a vector of N QAM constellation points and duplicates each carrier with its conjugate counterpart so the 2N output samples are real. The 2N time domain samples may have for example the last 2N/16 samples appended as a cyclic extension (which may include a cyclic suffix, a windowing function and/or a cyclic prefix extension) for every symbol, and are then delivered to a DAC (digital-to-analog converter). The set of time domain samples represents a summation of all the modulated sub-channels, for the duration of one data frame. In the receive path, the first 2N/16 samples (cyclic prefix) from the ADC are removed from every symbol. A FFT module transforms the carriers back to phase and amplitude information (N complex QAM symbols). Correction for attenuation of the signal amplitude and phase shifts (i.e., overall distortion) is implemented. If the QAM constellation is thought of as points in a grid where rows and columns represent phase and amplitude information respectively, then the grid effectively rotates reference to the constellation points to correct for these distortions.

Based on the SNR, which has been established for the tones, they are classified based on the SNR such that a "path" is selected for each tone through the encoding device, and each of the tones is transmitted along to the framing unit through the corresponding selected transmission path. This is illustrated in FIG. 2(a), in which the framing unit 1 for producing V/ADSL frames receives data along two paths 2, 3. Each path 2, 3 leads to a respective block 4, 5, which constructs respective portions of frames. The frame is shown in FIG. 2(b), including a portion 6 generated by block 8, and a portion 7 constructed by a block 9 (which may be an interleaver). The outputs of the blocks 4, 5 are stored respectively in a fast buffer 8 and interleaved buffer 9, until they are transmitted out of the framing unit 1. Since the interleaver 5 interleaves data over a period of time, data transmitted along path 3 will have a different (higher) latency than data transmitted along the path 2. Thus, these two paths are referred to as different "latency paths" (e.g., they may be referred to as LP1 and LP2). Note that both paths LP1 and LP2 may be interleaved.

DMT technology also includes a feature known as "tone ordering." This means that the encoder, in forming VDSL symbols (there may be multiple VDSL frames within one VDSL symbol), determines the order in which subcarriers are assigned bits. The term tone ordering is wide enough to include both (i) determining the order in which the subcarriers are assigned data transmitted along a given latency path; and (ii) the order in which the subcarriers are assigned data transmitted along the different latency paths.

Furthermore, the number of bits that are transmitted by each of the tones may be modified if the estimated SNRs of the tones are revised: increasing the number of bits stored per frame in some tones and correspondingly reducing the number of bits stored per frame in other tones. There could be other reasons to dynamically change the bit allocation for spectral reasons too. This process is known as "bit swapping."

For further details of the ADSL2 standard, the reader is referred to the document ITU-T Recommendation G.992.3 published by the International Telecommunication Union, the disclosure of which is incorporated herein by reference in its entirety.

While ADSL provides Internet connections that are many times faster than a 56K modem, they still are not fast enough to support the integration of home services such as digital television and Video-on-Demand. However, another DSL technology known as very high bit-rate DSL (VDSL) is seen by many as the next step in providing a complete home-communications/entertainment package.

In contrast to ADSL, a conventional VDSL standard (here referred to as VDSL1) uses a number of bands, e.g., as shown in FIG. 3, which may go up to, for example, 12 MHz. Data rates are typically larger than those of ADSL, e.g., 8 k samples per VDSL symbol for 4096 point-FFT. VDSL has a number of further differences from ADSL. For example, VDSL1 has different framing methods from ADSL2 (for example, with no sync symbol), it does not include Trellis encoding, and its interleaving system is different. In the ADSL2 system, the tone ordering is applied to all the tones used for communication in a given direction. Up until now, two sets of memories were required on a chip. If this feature is incorporated into future versions of VDSL, here referred to as VDSL2, with 4 k tones or higher, each of the bit allocation table, gain tables, tone ordering tables each for 4 k tones requires significant on-chip memory.

SUMMARY OF THE INVENTION

Embodiments of the present invention aim to provide new and useful protocols for transmitting data through lines such as telephone lines. Typically these protocols have transmission rates of over 24 Mbps, and often much higher.

Embodiments of the present invention propose in general terms that the tones of a signal are grouped, a portion of data is associated with each of the groups of tones, and that the tones of the group are used together to transmit the corresponding portion of data (e.g., in a way determined by a measured SNR of each tone, or possibly by a selection made by the unit receiving the transmitted data).

A selection may be made from the tones of the group such that each of the tones of the group is allotted a respective role in transmitting the data.

Thus, any one or more of tone ordering, bit swapping, and/or selection of gains for each tone (e.g. gain scaling) is done within the members of a group.

This idea is applicable both to tone ordering etc., following the training stage, and also to the dynamic configuration changes subsequently, for example, bit swapping.

Implementations of the invention may offer the advantage (compared to treating all the tones of a given direction equivalently for the purposes of bit allocation, bit swapping, gain allocation and tone ordering) that the computational cost of coding and decoding the data is reduced.

Furthermore, embodiments of the invention make it possible to significantly reduce the memory requirements of the encoder and decoder. By contrast, the current tone re-ordering system implemented in an ADSL system allows for tone re-ordering to happen across all the tones during the seamless rate adaptation. To allow that, it is required to have two copies of the constellation gains, bit allocation tables and tone re-ordering tables for all the tones. For an VDSL2 system with potential 4 k tones, this requires significant memory on the chip. By means of applying tone ordering etc., only to the tones of groups, it is proposed to reduce the above requirements and provide provision to achieve the possible means to dynamically adapt the data rates.

The groups may be defined in various ways within the scope of the invention, and need not be the same.

A first possibility is for the groups to correspond to the bands (i.e., that all the consecutive tones that transmit information in a given direction are in the same group).

A second related possibility is for there to be multiple groups within each of the bands, but such that all the tones of any given group are all within a single one of the bands.

A third possibility is for the groups to be selected irrespective of the bands, e.g., such that each group of tones are consecutive ones of the tones for transmitting data in a given direction. For example, the groups of upstream (downstream) tones may be consecutive, with some of the groups extending over more than one of the upstream (downstream) bands.

In any of these three possibilities, the groups may be pre-defined, i.e., as part of the protocol. However, this feature is not required by the invention, which may instead allow the groups to be defined based on the SNR ratios.

For example, a fourth possibility is for the groups to be defined based on the SNR ratios, but for the number of tones in each group to be limited. In one form of this possibility, for example, the tones of a given group may be selected from any of the tones associated with a given direction of communication (e.g., based on conventional tone ordering) but each group is limited to a maximum number of tones. This too would help to ensure that errors are not propagated between the groups.

These various possibilities can be performed in combination. For example, a further way to select groups would be based on SNR ratios (as in the fourth possibility) but such that the tones of any given group are within only a single one of the bands (as in the first possibility).

A particularly preferred example is for tone ordering etc., to be performed during the learning phase for tones that are members of groups that are entirely within a single band. Furthermore, the latency paths etc., selected for each tone are preferably determined based on the SNRs only of that tone and the other tones that are members of the same group. Subsequently, bit swapping is only performed to re-allocate the bits between the tones of these same groups.

In one of the related patent applications referenced above, it is proposed that the tones of a signal are grouped, and that Trellis encoding is performed on the data which is to be transmitted on the tones of each group. This concept is freely combinable with the present invention. One possibility is for the same groups, which are used for Trellis encoding, to be used to perform any one or more of bit allocation, bit swapping, selection of gains for each tone and/or selection of paths for each tone. Alternatively, different groups can be used for the Trellis encoding from those that are used for any one or more of the other four schemes.

In another of the related patent applications referenced above, we propose that the transmission protocol includes at least two modes defined by respective band plans. Multiple modes may be useful when the volume of data that is to be transmitted is reduced, e.g. to save power requirements for encoding and transmission and/or reception and decoding. In one form of this idea, at least a first band plan associated with a first of these modes employs a maximum frequency for data transmission, which is higher than the maximum frequency used for data transmission in a second band plan associated with a second of the modes.

Embodiments of the present invention are advantageously combinable with this idea, since in the case that the groups are defined (e.g., predefined) to include groups of low frequency and groups of relatively high frequency, the transition from one protocol to the other can be performed by simply ceasing to transmit data on a plurality of the high frequency groups of tones. (Note that this does not necessarily imply that nothing at all is transmitted on these high frequencies. Rather, there may still be a transmission of signals, but these signals do not include encoded data. They may for example be predefined, or essentially random. One reason for continuing to broadcast signals at these frequencies may be that ceasing to do so would itself change the noise environment.)

BRIEF DESCRIPTION OF THE DRAWINGS

Preferred features of the invention will now be described, for the sake of illustration only, with reference to the following figures in which.

DETAILED DESCRIPTION OF ILLUSTRATIVE EMBODIMENTS

Figure 4:
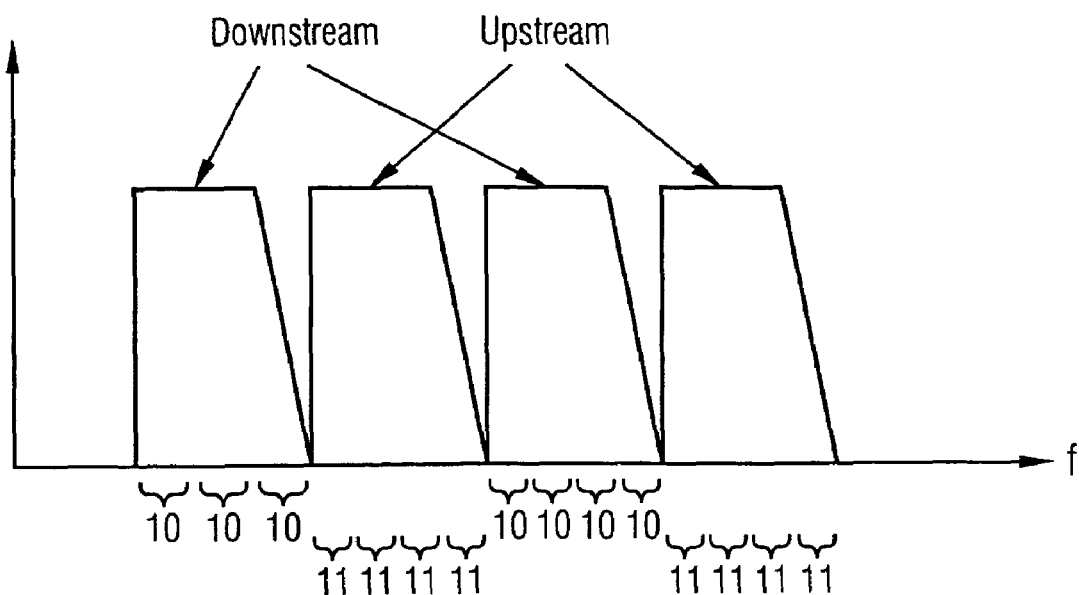
FIG. 4 shows schematically grouping of tones in a first embodiment of the invention.

Referring to FIG. 4, a schematic view is shown of bandwidth allocation in a protocol, which is a first embodiment of the invention. Many features of the protocol, which are not described, are generally according to the ADSL standard (which is described for example in the document ITU-T Recommendation G.992.3 published by the International Telecommunication Union), which standard is incorporated herein by reference. In particular the protocol preferably includes any one or more of the following: (i) tone ordering (for determining the order in which subcarriers are assigned bits); (ii) bit allocation (i.e., selection of the number of bits to be transmitted on each tone); (iii) gain selection; and (iv) bit swapping, all carried out on a group-by-group basis. Optionally also, Trellis encoding may be performed based on the same groups.

Figure 3:
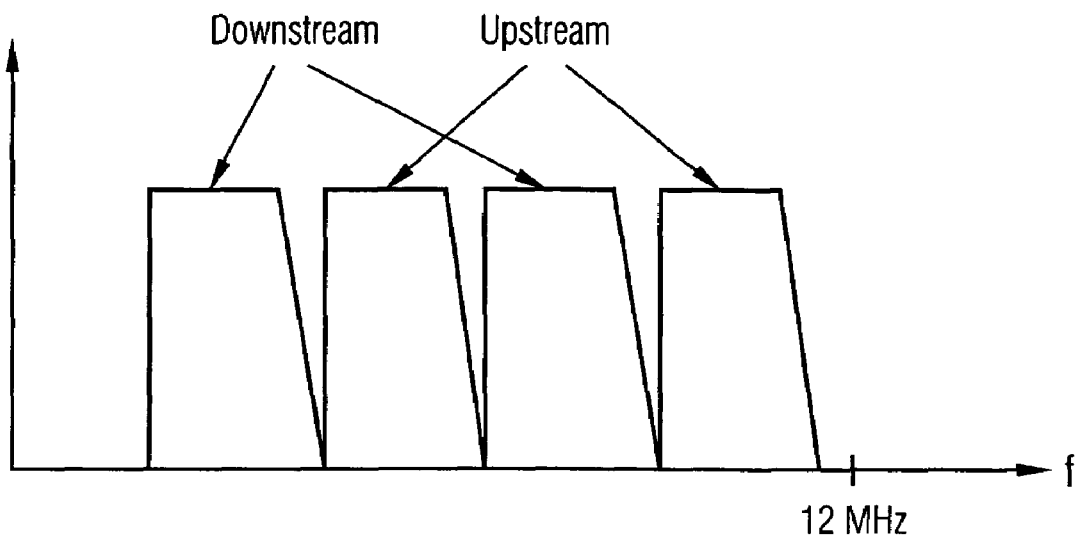
FIG. 3 shows the frequency usage of a conventional VDSL technique.

Generally speaking, in this first embodiment the upstream and downstream allocation of the bandwidth may be as in VDSL (i.e. as shown in FIG. 3), but within the scope of the invention any other allocation is also possible. Indeed, an embodiment of the invention having a novel allocation of the bandwidth into bands is described in one of the related applications referenced above.

The first embodiment has the feature that in at least one, and more preferably both, of the upstream and downstream directions, the tones are grouped into groups 10, 11 (in FIG. 4 the downstream groups are labeled 10 and the upstream groups are labeled 11). In various versions of the first embodiment within the scope of the invention this grouping is done in various ways. A first possibility, for example, is to predetermine the number of tones in each group 10, 11 (e.g., such that all groups are the same number N of tones, such as 4 tones), and then to allocate tones to groups according to a simple scheme, for example such that the groups 10 are respective sets of N consecutive tones.

Figure 1:
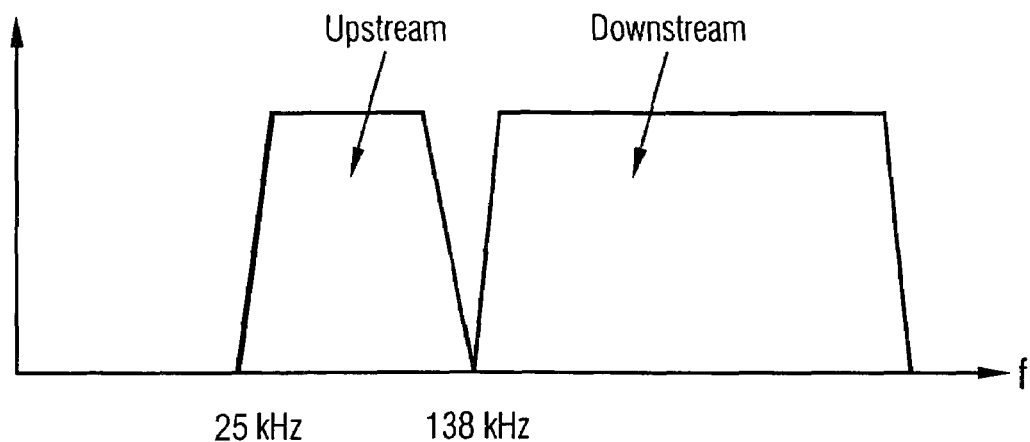
FIG. 1 shows the frequency usage of a conventional ADSL technique.
Figure 2A:
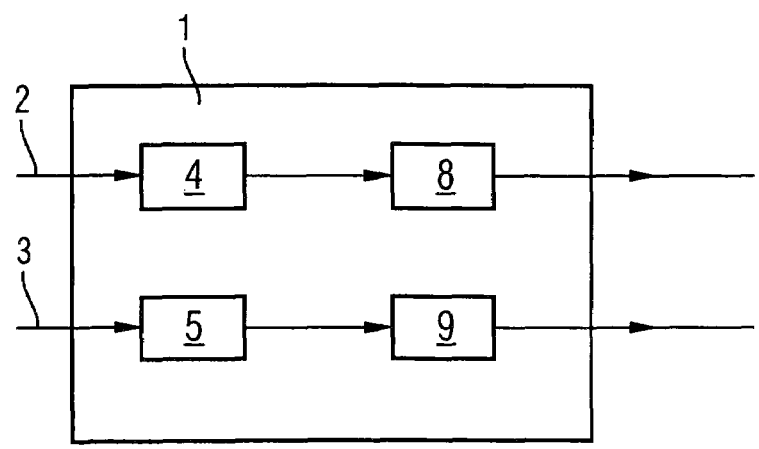
FIG. 2, which is composed of FIGS. 2(a) and 2(b), illustrates tone ordering in a conventional ADSL technique.
Figure 2B:
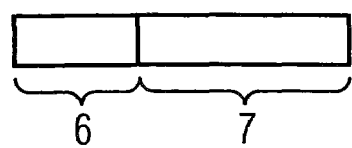

In the first embodiment of the invention, the groups are used for encoding the data. The operations of selecting the number of bits to be transmitted per tone and/or selection of the gains and/or selection of latency paths and/or bit swapping, are performed only in relation to the tones of single groups 10, 11. For example, within a certain group the SNR of each of the tones may be established during a training phase, and based on this SNR value a selection may be made of which of a plurality of paths each of the tones in the groups should be transmitted along. The plurality of paths preferably include at least one path with interleaving, and at least one path without interleaving. The two paths may, for example, be generated by a system as shown in FIG. 2(a). However, note that the invention is not limited in this respect, and in particular there may be more than two possible paths.

FIG. 5 shows the downstream and upstream spectrum for VDSL1 services according to two more specific forms of this embodiment of the invention. All three forms share the bands illustrated in FIG. 5(a): two upstream bands are shown as US1 and US2, and two downstream bands shown as DS1 and DS2. As shown in FIG. 5(b) and FIG. 5(c), a first form of the embodiment proposes that each of the downstream and upstream frequency bands respectively be further grouped in several groups $GD_1, \ldots GD_n$ and $GU_1, \ldots GU_m$, where n and m are respectively the number of groups for downstream and upstream transmission. It will be noted that GD3 is shown including tones from both DS1 and DS2, while GU3 is shown including tones from both US1 and US2. However, in other forms of the invention the groups may be defined such that each group is entirely within one of the bands (i.e., a given band may be partitioned into groups, e.g., such that each of the groups is a set of consecutive tones).

Figure 5A:
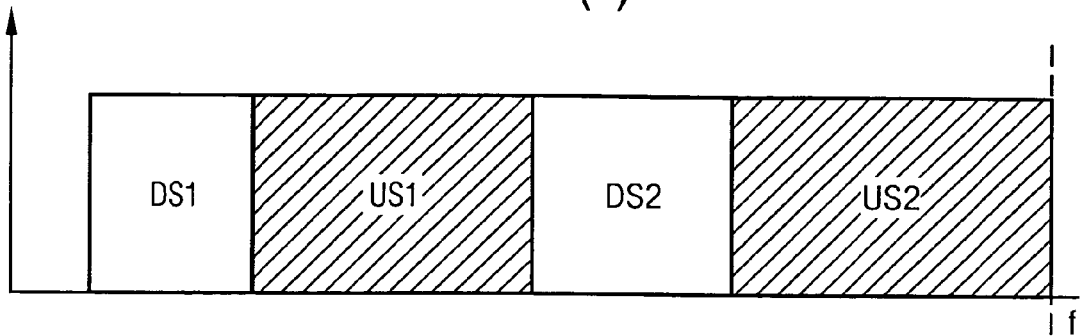
FIG. 5, which is composed of FIGS. 5(a) to 5(d), shows two specific examples of grouping the tones in embodiments of the invention.
Figure 5B:
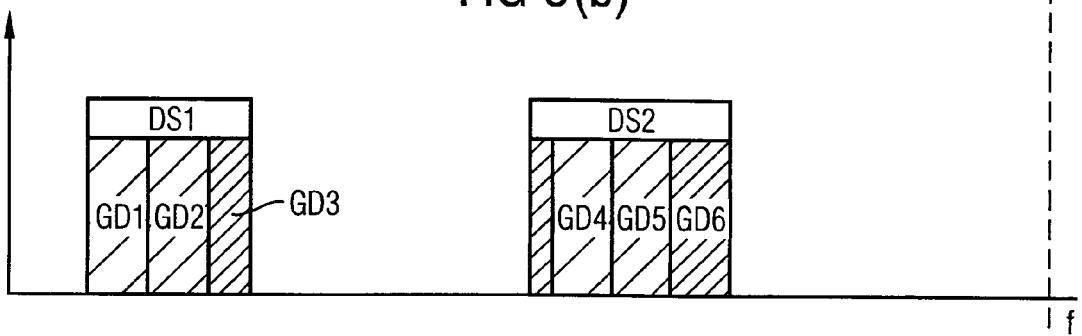
Figure 5C:
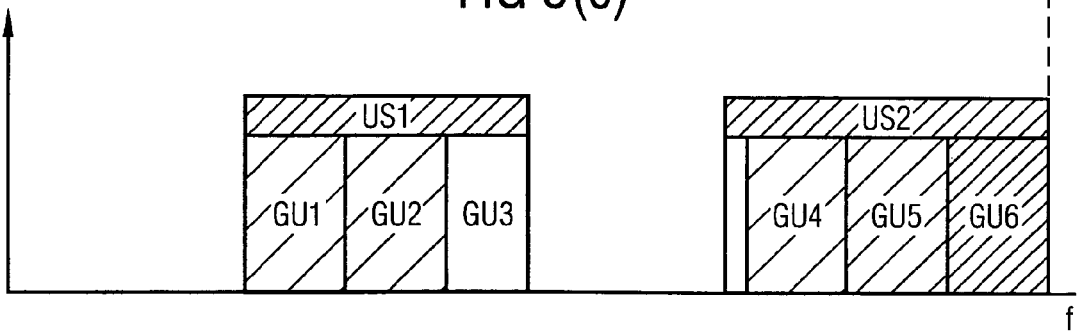
Figure 5D:
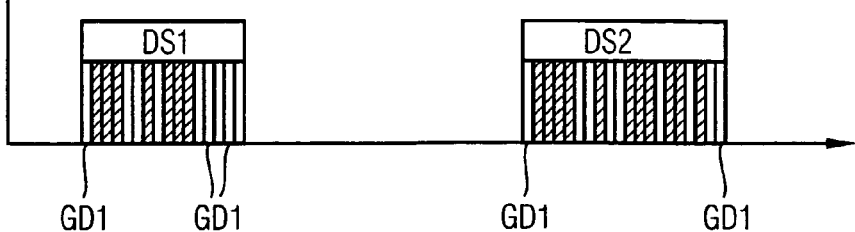

Alternatively, as shown in FIG. 5(d) (which shows, for the sake of example only, the downstream direction), the frequency tones within each of the groups may also span across the complete frequency spectrum (i.e. the groups include members from both bands of the downstream direction), which could be more efficient for Trellis encoding and could be also dependent on the latency paths or tone ordering. In FIG. 5(d) areas with the same shading level represent tones within the same group. Thus, for example, the tones of FIG. 5(d) labeled $GD_1$ are the tones that together constitute the band $GD_1$.

Note that certain embodiments of the invention include Trellis encoding; others do not. Let us consider for a moment embodiments that do include Trellis encoding. In both forms of the invention (i.e. the one shown by FIGS. 5(b) and 5(c), and the one shown by FIG. 5(d)), the set of tones encoded together by Trellis encoding may be defined completely independently of the groups described above. For example, all tones associated with a given direction may be Trellis encoded together. It is also possible that the frequency band DS1 be covered with a single Trellis group and the frequency band DS2 to be covered with second single Trellis group, and similarly for the upstream bands. That is, the groups used for Trellis encoding may have nothing to do with the groups used for bit allocation, bit swapping, tone ordering and/or gain selection.

Alternatively, the same groups illustrated in FIGS. 5(b) and 5(c) or in FIG. 5(d) can be used for Trellis encoding. That is, from the point of view of FIG. 4, Trellis encoding may be used only to combine the N tones within the groups 10, 11. The decoding of such data is much cheaper computationally than if Trellis encoding is performed encoding together data that is to be placed in all the tones (as in ADSL). Thus, the computational cost of decoding the data is much reduced. For example, if the Trellis encoder employs four states in its algorithm, then decoding of the Trellis data can be performed in about 20 stages in a Viterbi decoder (that is, the number of states multiplied by a parameter, which from statistical theory is known to be about 5). If the number of tones in each group is lower, then the computational tasks to be performed could be made more efficient and simpler.

Figure 6A:
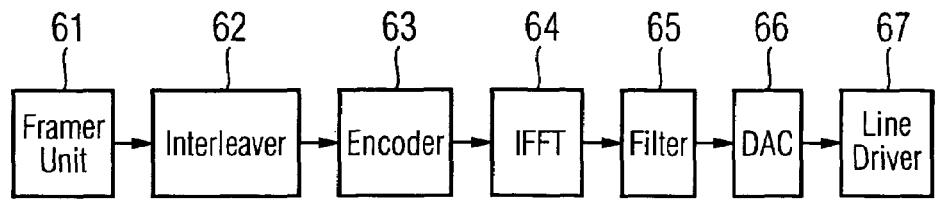
FIG. 6, which is composed of FIGS. 6(a) and 6(b), shows two possible structures of data transmission apparatus according to the embodiment.

FIG. 6(a) shows the structure of a communication apparatus for use in generating the protocol as described above with reference to FIG. 4 or FIG. 5. It includes a framer unit 61, which receives data to be transmitted and arranges it into frames, an interleaver 62, a QAM encoder 63 (which is where the Trellis modulation, bit allocation and tone ordering occur). Note that the data taken into the encoder is taken from both latency paths LP0 and LP1, and the control unit of the encoder 63 of the tone ordering. The apparatus also includes an IFFT unit 64, a filter 65, a digital-to-analog converter 66 and a line driver 67. This structure is not new, although the operation of the encoder 63 (and optionally the interleaver 62) is different from known systems to produce the protocols of the invention. The interleaver 62 includes various paths with different latencies, and tone ordering consists of allocating data to different ones of the tones.

The communication apparatus generally includes other elements, such as a quality determination unit for determining the SNR of each of the tones on the line (this unit may in principle be located outside the transmitter, such as at the other end of the telephone line, and arranged to transmit its results to the transmitter). Additionally, there is a processor for controlling the operation of one or more of the units shown in FIG. 6(a) (especially the encoder 63) on the basis of the output of the quality determination unit.

Figure 6B:
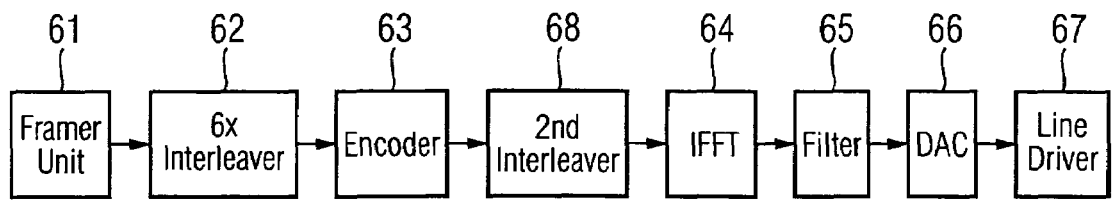

FIG. 6(b) shows the structure of a second transmission apparatus for use in generating the protocol as described above. In contrast to the structure of FIG. 6(a), in FIG. 6(b) there is an additional second interleaver 68 located after the QAM encoder 63. The purpose of the second interleaver 68 is to simplify the required operation of the first interleaver 62 and the encoder 63 in case the grouping is a particularly complex one, such as the coding of FIG. 5(d), in which the tones of a given group are not at consecutive frequencies. The protocol could increase the performance of the system.

Note that the interleaver(s) 62, 68 may be any of a convolutional interleaver, a triangular interleaver or a general convolutional interleaver (these terms are well-defined in this field).

We now describe the ways in which tone ordering, bit allocation, gain allocation and bit-swapping are performed in the first embodiment of the invention as described above in relation to FIG. 4 and/or FIG. 5. This is performed using many of the techniques known already for tone ordering etc., and reference is made in particular to the ADSL standard G992.3, and in particular FIGS. 7 and 8.

Specifically, during initialization, the receive PMD function shall calculate the numbers of bits and the relative gains to be used for every subcarrier, as well as the order in which subcarriers are assigned bits (i.e., the tone ordering). The calculated bits and gains and the tone ordering shall be sent back to the transmit PMD function during a later stage of initialization (see 8.5.3.3 of the standard).

The pairs of bits and relative gains are defined, in ascending order of frequency or subcarrier index i, as a bit allocation table b and gain table g (i.e., bi and gi, for i=1 to NSC−1, with b1 bits to be allocated to subcarrier 1 and bNSC−1 bits to be allocated to subcarrier NSC−1). If Trellis coding is used, the receive PMD function shall include an even number of 1-bit subcarriers in the bit allocation table b.

The tone ordering table t is defined as the sequence in which subcarriers are assigned bits from the input bitstream (i.e., ti for i=1 to NSC−1, with constellation mapping beginning on subcarrier t1 and ending on subcarrier tNSC−1). The tone ordering table t shall remain static for the duration of the session.

Following receipt of the tables b, g and t, the transmit PMD function shall calculate a reordered bit table b' and a reordered tone table t' from the original tables b and t. Constellation mapping shall occur in sequence according to the re-ordered tone table t', with the number of bits per tone as defined by the original bit table b. Trellis coding shall occur according to the re-ordered bit table b'.

If Trellis coding is not used, b'=b and t'=t.

If Trellis coding is used, the re-ordering of table t shall be performed by the transmit PMD function. The re-ordered tone table t' shall be generated according to the following rules:

Indices of all subcarriers supporting 0 bits or 2 or more bits appear first in t', in the same order as in table t.

Indices of all subcarriers supporting 1 bit appear last in table t', in the same order as in table t.

If the bit allocation does not include any 1-bit subcarriers, the re-ordered tone table t' is identical to the original tone table t.

The (even number of) 1-bit subcarriers shall be paired to form 2-dimensional constellation points as input to the Trellis encoder. The pairing shall be determined by the order in which the 1-bit subcarriers appear in the original tone ordering table t.

The table b' is generated by scanning the re-ordered tone table t' and re-ordering the entries of table b according to the following rules (with NCONEBIT representing the number of 1-bit subcarriers in the bit allocation table b):

The first NCONEBIT/2 entries of b' shall be 0, where NCONEBIT is the (by definition, even) number of subcarriers supporting 1 bit.

The next entries of b' shall be 0, corresponding to the subcarriers that support 0 bits.

The next entries of b' shall be non-zero, corresponding to the subcarriers that support 2 or more bits. The entries shall be determined using the new tone table t' in conjunction with the original bit table b.

The last NCONEBIT/2 entries of b' correspond to the paired 1-bit constellations (i.e., 2 bits per entry).

The table b' is compatible with the G.992.1 Trellis encoder.

The tables b' and t' shall be calculated from the original tables b and t as shown in the tone pairing and bit re-ordering processes below.

```
/* TONE RE-ORDERING PROCESS */
t__index=1; /* tone order index t__index is index of array t */
t'__index=1; /* tone paired index t'__index is index of array t' */
while (t__index<NSC) {
  tone=t[t__index++]; bits=b[tone];
  if (bits=0) { t'[t'__index++]=tone; }
```

-continued

```
if (bits==1) { }
if (bits ≧2) { t'[t'__index++]=tone; }
}
while (t'__index<NSC) t'[t'__index++]=1;
/* BIT RE-ORDERING PROCESS */
NC1=0; /* NCONEBIT is the number of tones with 1 bit */
NCL=0; /* NCUSED is the number of used tones (at least 1 bit) */
for (i=1; i<NSC; i++) { if (b[i]>0) NCL++; if (b[i]==1) NC1++; }
b'__index=1; while (b'__index<(NSC-(NCUSED-NCONEBIT/2)))
b'[b'__index]=0;
t'__index=1; while (t'__index<NSC) {
  tone=t'[t'__index++]; bits=b[tone];
  if (bits==0) { }
  if (bits==1) { b'[b'__index++]=2; t'__index++; }
  if (bits ≧2) { b'[b'__index++]=bits; }
```

If on-line reconfiguration changes the number or indices of 0-bit subcarriers or 1-bit subcarriers, then tables t' and b' shall be recalculated from the updated table b and the original table t.

The constellation encoder takes L bits per symbol from the PMS-TC layer. If Trellis coding is used, the L bits shall be encoded into a number of bits L' matching the bit allocation table b and the re-ordered bit table b', i.e., into a number of bits equal to $L'=\Sigma b_i'=\Sigma b_i$. See 8.6.2 of the standard. The value of L and L' relate as:

$$L' = \sum b_i' = \sum b_i = L + \left\lceil \frac{NCUSED - \frac{NCONEBIT}{2}}{2} \right\rceil + 4$$

with the $\lceil x \rceil$ notation representing rounding to the higher integer. The above relationship shows that using the 1-bit subcarrier pairing method, on average, one Trellis overhead bit is added per set of four 1-bit subcarriers, i.e., one Trellis overhead bit per 4-dimensional constellation. In case Trellis coding is not used, the value of L shall match the bit allocation table, i.e., $L=\Sigma b_i$.

A complementary procedure should be performed in the receive PMD function. It is not necessary, however, to send the re-ordered bit table b' and the re-ordered tone table t' to the receive PMD function because they are generated in a deterministic way from the bit allocation table and tone ordering tables originally generated in the receive PMD function, and therefore the receive PMD function has all the information necessary to perform the constellation demapping and Trellis decoding (if used). Alternatively, it means that the receive PMD could only send the delta information of the re-ordered table and need not send the complete table. In a further version, it may not be required to maintain the original table but only work with delta tables for any later changes.

All these features are incorporated in the first embodiment. If, as discussed above, the groups of the Trellis coding are as shown in FIGS. 5(b) and 5(c), or alternatively in FIG. 5(d), the tone ordering etc., may be performed using only the tones of the same groups used for Trellis encoding, e.g., with all the tones of the group transmitted using the same latency path.

For the online reconfiguration, for efficient implementation, one option is to limit the tone ordering process within a group for a single latency path. The bit-swap procedure should be limited to one group at one time. After the procedure is completed for one group, the bit swapping procedure is extended to the next group.

Figure 7A:
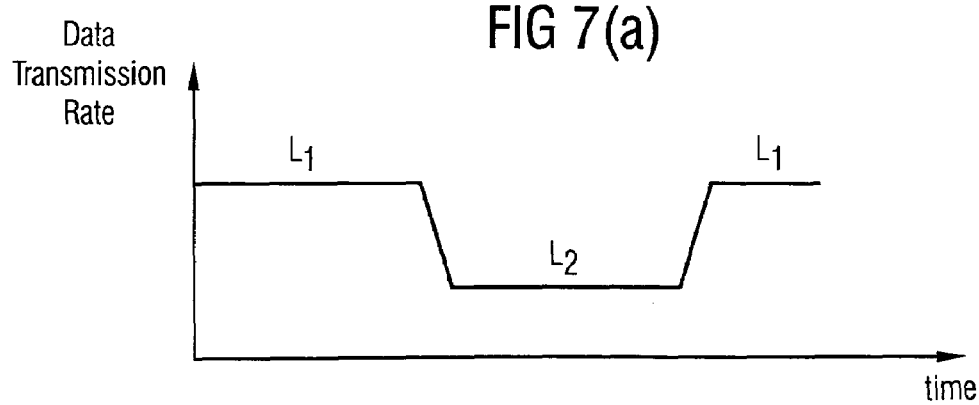
FIG. 7, which is composed of FIGS. 7(a) and 7(b), shows schematically the variation of data transmission rate in certain embodiments of the invention.

Some of the related patent applications referenced above describe systems in which the protocols permit a low power mode of operation, principally saving power consumption in the IFFT in the case of the encoder, or the FFT in the case of the decoder. This is illustrated in FIG. 7(a), which shows switching at different times between two modes $L_1$ and $L_2$. In these two modes the data transmission rate may be different.

Figure 7B:
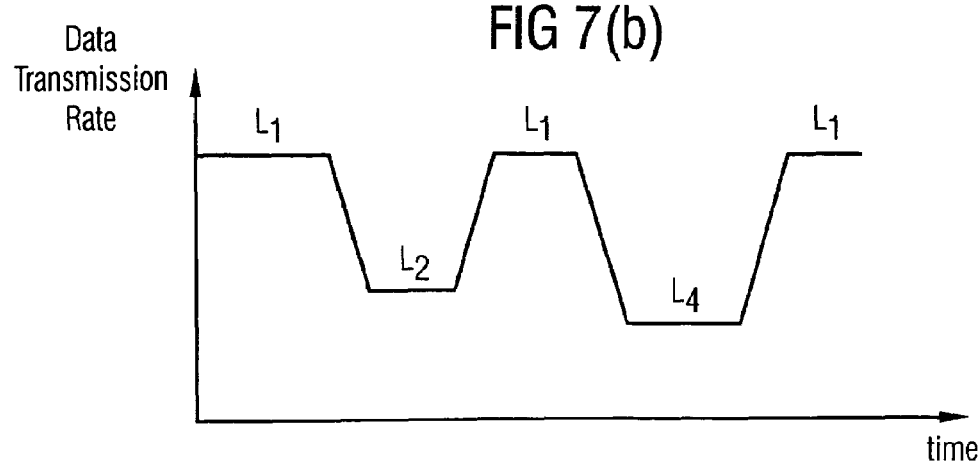

In fact, there may be a choice of different power saving modes. This is illustrated in FIG. 7(b) in which the protocol uses a first power saving mode $L_2$ at a first time, and a second power saving mode $L_4$ at other times.

FIG. 8 shows various specific band plans which can be produced in the various modes of operation explained in these related applications. FIG. 8(a) shows the full frequency range (up to 17 MHz) being used for transmitting data (i.e., the VDSL high power mode). (Otherwise frequencies up to 30 MHz may be used).

Figure 8A:
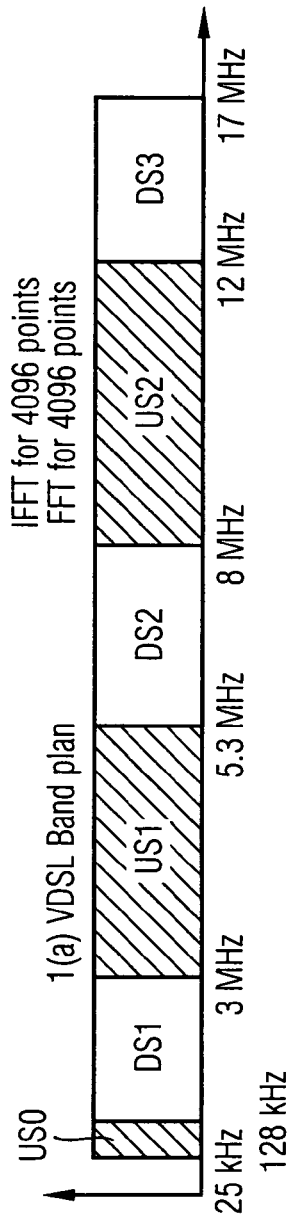
FIG. 8, which is composed of FIGS. 8(a) to 8(f), shows possible band plans in accordance with FIG. 7.
Figure 8B:
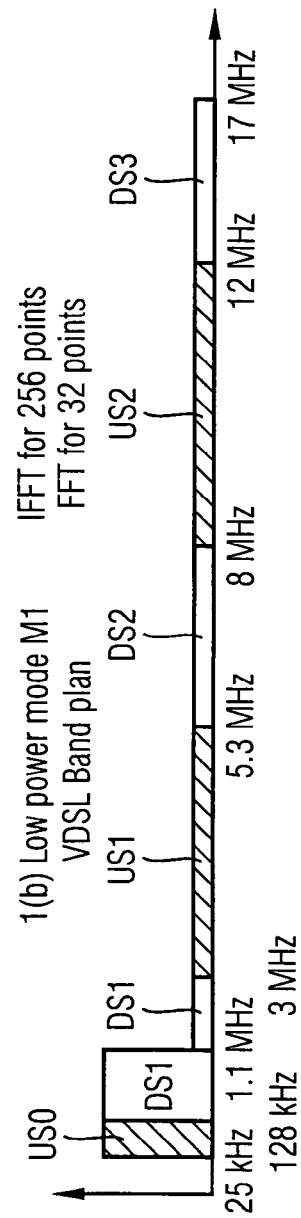

FIG. 8(b) shows a different mode of operation, in which only frequencies up to 1.1 MHz are used for transmitting data. Those frequencies above 1.1 MHz are shown with low values to indicate that no signal is transmitted on those frequencies, or (in other forms of the embodiments) that signals are transmitted which do not carry data. For example, it may be advantageous to broadcast signals which do not carry data on frequencies 1.1 MHz to 17 MHz, to avoid changing the noise environment.

In yet further versions, the maximum transmission rate may be lower for the range of frequencies, which are shown as having a low value. In other words, the range of frequencies (a "high frequency range") between 1.1 MHz and 17 MHz may be used to carry a certain data load in the first mode of operation, and a lower amount of data in the mode of FIG. 8(b).

Figure 8C:
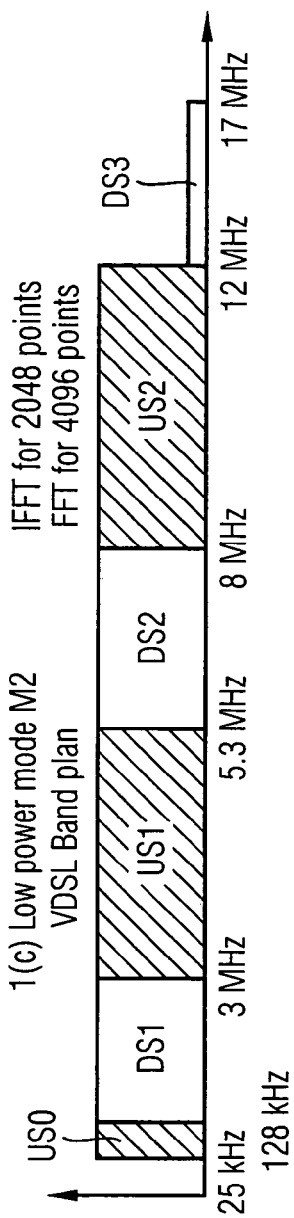

FIG. 8(c) shows a third mode of operation in which frequencies up to 12 MHz are used for transmitting data. Just as described above in relation to FIG. 8(a), the frequencies above 12 MHz which are shown as "low" may be unused, used for non-data transmission, or used for data transmission at a lower data transmission rate than in FIG. 8(a).

Figure 8D:
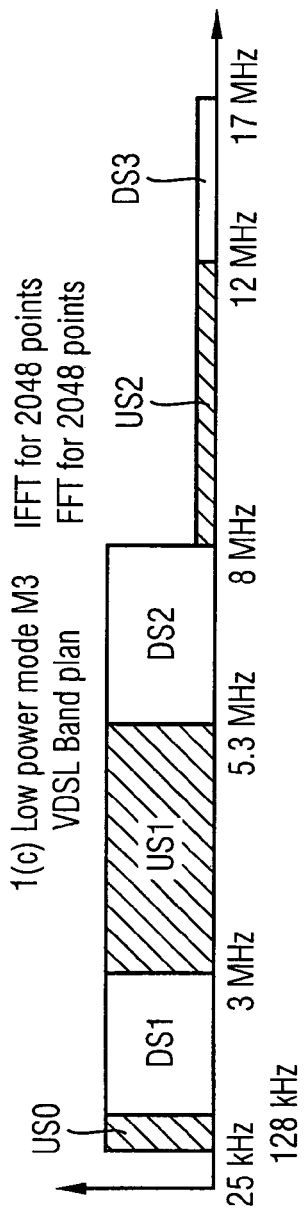

FIG. 8(d) shows a fourth mode of operation in which frequencies up to 8 MHz are used for transmitting data. Just as described above in relation to FIG. 8(a), the frequencies above 8 MHz which are shown as "low" may be unused, used for non-data transmission, or used for data transmission at a lower data transmission rate than in FIG. 8(a).

Figure 8E:
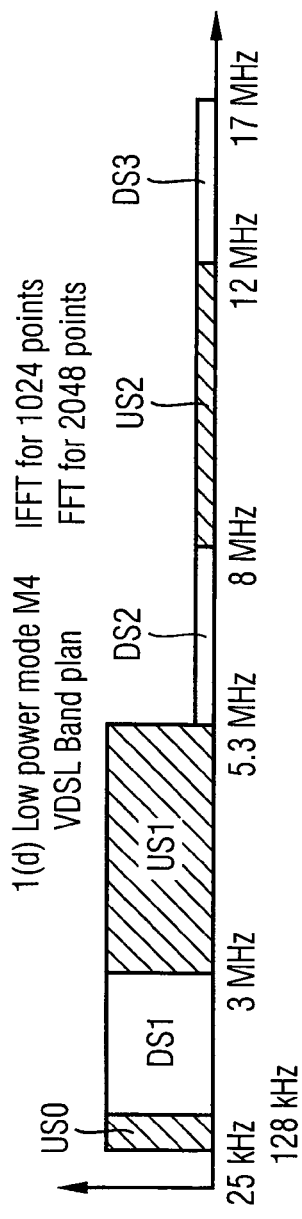

FIG. 8(e) shows a fifth mode of operation in which frequencies up to 5.3 MHz are used for transmitting data. Just as described above in relation to FIG. 8(a), the frequencies above 5.3 MHz which are shown as "low" may be unused, used for non-data transmission, or used for data transmission at a lower data transmission rate than in FIG. 8(a).

Figure 8F:
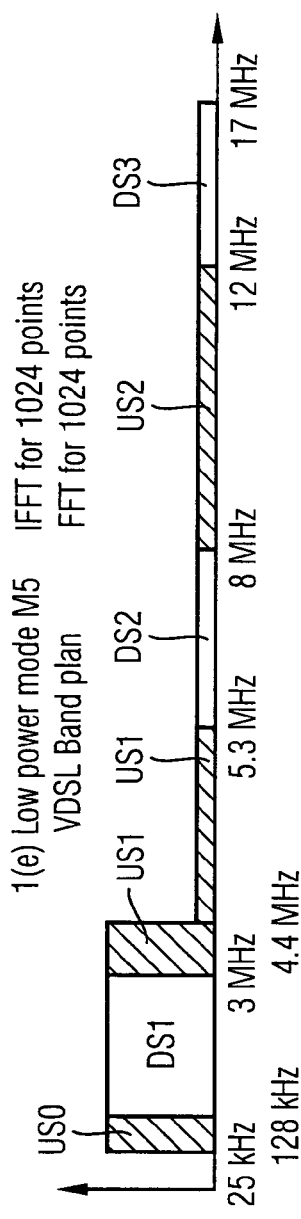

FIG. 8(f) shows a sixth mode of operation in which frequencies up to 4.4 MHz are used for transmitting data. Just as described above in relation to FIG. 8(a), the frequencies above 4.4 MHz which are shown as "low" may be unused, used for non-data transmission, or used for data transmission at a lower data transmission rate than in FIG. 8(a).

These concepts are freely combinable with embodiments of the present invention. For example, in the case that the groups of the embodiment are defined (e.g., predefined) to include groups of low frequency and groups of relatively high frequency (i.e., all the tones of a high-frequency group are of higher frequency than all the tones of a low frequency group), the transition from one protocol to the other can be performed by ceasing to transmit data on one or more of the high frequency groups of tones (either ceasing to transmit a signal at all the frequencies contained in the high-frequency groups, or continuing to transmit signals at those frequencies, but arranging that those signals do not include data). This combination is particularly suitable in the case that no groups include tones from more than one band.

During the low power modes the transmission may be restricted to only a few bands. Hence, if it is allowed to smoothly transit from one mode of transmission to another, it allows for smooth transition of the mode. In low power mode, the same set of tone ordering tables and bit gain tables could be used with the exception that the bands not used for transmission during the low power modes may not be used. The Trellis pairs also will not be affected and hence allows for seamless transition to low power mode. This mode of operation provides efficient implementation.

Although only a few embodiments of the invention have been disclosed in this application, many variations are possible within the scope of the invention as will be clear to a skilled reader. For example, possible embodiments of the invention exist wherein the modulation technique is other than one using an IFFT.

What is claimed is:

1. A method of two-directional communication of data over a line, the communication employing a bandwidth partitioned into a number of bands and including at least one band associated with each of the two directions, the method including encoding the data carried in each direction by modulation of a plurality of tones defined within the at least one band associated with that direction, the tones being associated into a plurality of groups of tones, each group of tones including a plurality of the tones, the method including for each group of tones:
    deriving a measure of the quality of transmission of each of the tones;
    obtaining data, respective portions of the data being associated with respective groups of the tones;
    modulating the tones of the group to encode the associated portion of the data, the relative transmission quality of the tones of the group determining how the tones of that group are modulated to encode the data, wherein a respective proportion of the data to be carried by each tone of the group is determined for each tone of the group;
    re-determining the measure of the quality of transmission of each of the tones of the group; and
    according to said redetermination of the quality of transmission of the tones on the line, modifying within the group the respective proportions of the data encoded using the tones.

2. The method according to claim 1 and further comprising a re-determination of the measure of the quality of transmission of each of the tones of the group, and in accordance with the results of the re-determination a modification of the way in which the tones of the group are modulated to encode subsequent portions of data associated with the group of tones.

3. The method according to claim 1 wherein determining how the tones of the group are modulated to encode the data includes determining the order in which subcarriers are assigned data bits.

4. The method according to claim 3 wherein the assignment includes selecting data bits from two processing paths having a different latency.

5. The method according to claim 1 wherein determining how the tones of the group are modulated to encode the data includes determining a respective gain for each of the tones.

6. The method according to claim 1 wherein there are multiple groups within each of the bands, all the tones of any given group being within a single one of the bands.

7. The method according to claim 1 wherein each of the groups consists of all the tones of a respective one of the bands.

8. The method according to claim 1 wherein one or more of the groups include tones within at least two different respective bands.

9. The method according to claim 8 wherein each of the groups includes tones from multiple bands.

10. The method according to claim 1 and further comprising performing a pre-processing step in which the groups of tones are defined.

11. The method according to claim 1 and further comprising including switching between a high data transmission rate mode and a low data rate transmission mode, the switching including ceasing to transmit data using one or more of said groups of tones.

12. A communication apparatus for transmitting of data over a line as part of a two-directional communication of data over the line, the communication employing a bandwidth partitioned into a number of bands and including at least one band associated with each of the two directions, the apparatus including:
    a signal generation section for generating a signal by encoding the data carried in one of the directions along the line by modulation of a plurality of tones defined within the at least one band associated with that direction, the tones being associated into a plurality of groups of tones, each group of tones including a plurality of the tones, the signal generation section including:
        a quality determination unit for deriving a measure of the quality of transmission of each of the tones;
        an input section for receiving data;
        a processor for determining for each group of tones, in dependence on said measure of the quality of the transmission for each of the tones of the group, a scheme for modulating the tones of the group to encode a respective portion of data associated with the group of tones; and
        a modulator for modulating the tones of the group to encode the respective portion of data in accordance with the determined modulation scheme, wherein said processor is arranged to determine for each tone of the group the respective proportion of the data to be carried by that tone; and
    a signal transmission section including a line driver for transmitting the generated signal,
    wherein:
    the quality determination unit is arranged to perform at intervals a re-determination of the measure of the quality of transmission of each of the tones of the group; and
    the processor is arranged, according to said re-determination of the transmission quality of the tones on the line, to perform a modification within the group of the respective proportions of the data encoded using the tones.

13. The apparatus according to claim 12 wherein the quality determination unit is arranged at intervals to perform a re-determination of the measure of the quality of transmission of each of the tones of the group, and the processor is arranged to control the modulation means in accordance with the results of the re-determination to modify the way in which the tones of the group are modulated to encode subsequent data.

14. The apparatus according to claim 13 wherein said signal generation section includes at least two processing paths, the determination of how the tones of the group are modulated to encode the data including a determination of the order in which subcarriers are assigned data bits.

15. The apparatus according to claim 14 wherein the assignment includes selecting data bits from two processing paths having a different latency.

16. The apparatus according to claim 12 wherein said processor is arranged to determine a respective gain for each of the tones.

17. The apparatus according to claim 12 wherein there are multiple groups within each of the bands, all the tones of any given group being within a single one of the bands.

18. The apparatus according to claim 12 wherein each of the groups consists of all the tones of a respective one of the bands.

19. The apparatus according to claim 12 wherein one or more of the groups include tones within at least two different respective bands.

20. The apparatus according to claim 19 wherein each of the groups includes tones from multiple bands.

21. The apparatus according to claim 12 and further comprising a controller for switching between a high data transmission rate mode and a low data rate transmission mode by interrupting the transmission of data at one or more of said groups of tones.

* * * * *